(12) United States Patent
Lee et al.

(10) Patent No.: US 12,062,497 B2
(45) Date of Patent: Aug. 13, 2024

(54) CAPACITOR COMPONENT HAVING PROTECTIVE LAYER WHICH INCLUDES OXIDE CERAMIC AND METAL

(71) Applicant: SAMSUNG ELECTRO-MECHANICS CO., LTD., Suwon-si (KR)

(72) Inventors: Hyo Ju Lee, Suwon-si (KR); Chung Yeol Lee, Suwon-si (KR); Eun Hye Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 56 days.

(21) Appl. No.: 17/718,714

(22) Filed: Apr. 12, 2022

(65) Prior Publication Data
US 2023/0070629 A1    Mar. 9, 2023

(30) Foreign Application Priority Data
Aug. 27, 2021  (KR) .................. 10-2021-0114057

(51) Int. Cl.
| | |
|---|---|
| *H01G 4/30* | (2006.01) |
| *C04B 35/46* | (2006.01) |
| *C04B 35/64* | (2006.01) |
| *H01G 4/008* | (2006.01) |
| *H01G 4/012* | (2006.01) |
| *H01G 4/12* | (2006.01) |

(52) U.S. Cl.
CPC .............. *H01G 4/30* (2013.01); *C04B 35/46* (2013.01); *C04B 35/64* (2013.01); *H01G 4/008* (2013.01); *H01G 4/012* (2013.01); *H01G 4/12* (2013.01)

(58) Field of Classification Search
CPC .......... H01G 4/30; H01G 4/008; H01G 4/012; H01G 4/224
See application file for complete search history.

(56) References Cited

U.S. PATENT DOCUMENTS

| | | | | |
|---|---|---|---|---|
| 2002/0109575 A1* | 8/2002 | Jeong | ..................... | H01C 1/028 338/21 |
| 2010/0025075 A1* | 2/2010 | Feichtinger | ............... | H01G 4/12 156/89.12 |
| 2011/0290542 A1* | 12/2011 | Nishisaka | .............. | H05K 1/182 174/257 |

(Continued)

FOREIGN PATENT DOCUMENTS

| | | | | |
|---|---|---|---|---|
| DE | 102004005664 B4 | * | 12/2018 | ............... C03C 8/20 |
| JP | 2008124514 A | * | 5/2008 | |

(Continued)

OTHER PUBLICATIONS

Classification of Simple Oxides: A Polarizability Approach (Year: 2002).*

*Primary Examiner* — David M Sinclair
*Assistant Examiner* — Daniel M Dubuisson
(74) *Attorney, Agent, or Firm* — MORGAN, LEWIS & BOCKIUS LLP (57) ABSTRACT

A capacitor component includes a body including a dielectric layer and an internal electrode layer, a protective layer disposed on the body, and an external electrode disposed on at least a portion of the protective layer. The protective layer includes oxide ceramic and a metal the same as a metal of the internal electrode layer.

22 Claims, 6 Drawing Sheets

(56) References Cited

U.S. PATENT DOCUMENTS

| | | | | |
|---|---|---|---|---|
| 2014/0022689 A1* | 1/2014 | Kwag | ...................... | H01G 4/30 |
| | | | | 361/301.4 |
| 2017/0006741 A1* | 1/2017 | Dernovsek | ............. | H01G 4/224 |
| 2019/0103224 A1* | 4/2019 | Han | ..................... | H01G 4/2325 |
| 2021/0035744 A1 | 2/2021 | Atsumi et al. | | |
| 2022/0285097 A1* | 9/2022 | Iguchi | .................. | H01G 4/1209 |

FOREIGN PATENT DOCUMENTS

| | | |
|---|---|---|
| JP | 2019-140256 A | 8/2019 |
| JP | 2021-27094 A | 2/2021 |

* cited by examiner

CAPACITOR COMPONENT HAVING PROTECTIVE LAYER WHICH INCLUDES OXIDE CERAMIC AND METAL

CROSS-REFERENCE TO RELATED APPLICATION(S)

The present application claims the benefit of priority to Korean Patent Application No. 10-2021-0114057, filed on Aug. 27, 2021 in the Korean Intellectual Property Office, the entire disclosure of which is incorporated herein by reference.

TECHNICAL FIELD

The present disclosure relates to a capacitor component and a method of manufacturing the same.

BACKGROUND

With the recent trend for small-sized and lightweight electronic products, the development of ultra-small electronic components is progressing rapidly. In addition, with an increase in area, to which electronic components are applied, even in stability-important products such as automobiles and communications devices, there is increasing demand for electronic components having high reliability. A multilayer ceramic capacitor (MLCC), a type of electronic component, has been used as a component for various electronic components due to advantages thereof such as compactness and guaranteed high capacitance.

However, in accordance with miniaturization of a multilayer ceramic capacitor (MLCC) and an increase in capacitance thereof, a distance between internal electrode layers of the MLCC has been reduced and a dielectric layer of the MLCC has been thinned. Accordingly, an MLCC may be easily deteriorated due to a change in external environment, resulting in difficulty in securing high reliability.

SUMMARY

An aspect of the present disclosure is to provide a capacitor component which may improve moisture resistance reliability.

An aspect of the present disclosure is to provide a capacitor component which may allow current to flow between an internal electrode layer and an external electrode while improving moisture resistance reliability.

According to an aspect of the present disclosure, a capacitor component includes a body including a dielectric layer and an internal electrode layer, a protective layer disposed on the body, and an external electrode disposed on at least a portion of the protective layer. The protective layer includes an oxide ceramic and a metal the same as a metal of the internal electrode layer.

According to another aspect of the present disclosure, a method of manufacturing a capacitor component includes forming a dielectric green sheet, applying a first conductive paste to the dielectric green sheet, laminating the dielectric green sheets, applied with the first conductive paste, in plural to form a green chip, sintering the green chip to form a body including a dielectric layer and an internal electrode layer, forming a protective layer to cover the body using a vapor deposition process, and forming an external electrode on at least a portion of the protective layer. After the forming the external electrode, the protective layer includes oxide ceramic, having an average polarizability of oxide ions ($\alpha_{O2-}$) of 2 Å$^3$ or more and band gap energy of 3.0 eV or more to 4.0 eV or less, and a metal the same as a metal of the internal electrode layer.

According to another aspect of the present disclosure, a capacitor component includes a body including a dielectric layer and an internal electrode layer, an external electrode disposed the body, and a protective layer disposed between the internal electrode layer and the external electrode, and including oxide ceramic having an average polarizability of oxide ion ($\alpha_{O2-}$) of 2 Å3 or more.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a direction of gravity.

Terms such as "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, a first direction may be defined as a T direction or a thickness direction, a second direction may be defined as an L direction or a length direction, and a third direction may be defined as a W direction or a width direction.

Hereinafter, a capacitor component and a method of manufacturing the same according to an exemplary embodiment of the present disclosure will be described in detail with reference to the accompanying drawings. Referring to the accompanying drawings, the same or corresponding components may be denoted by the same reference numerals, and overlapped descriptions will be omitted.

Figure 1:
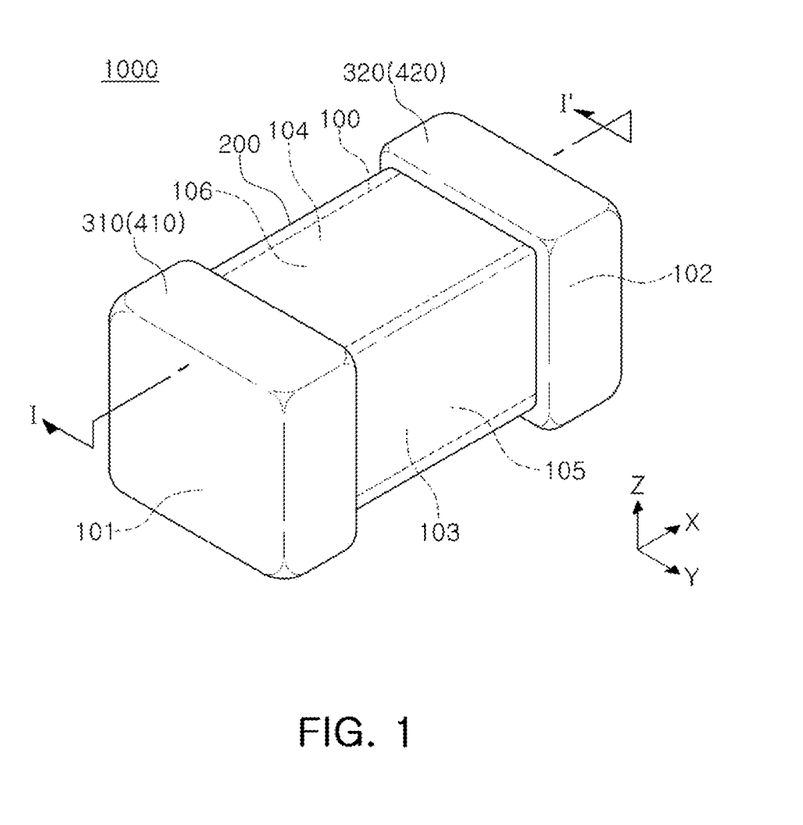
FIG. 1 is a schematic perspective view of a capacitor component according to an exemplary embodiment of the present disclosure.
Figure 2:
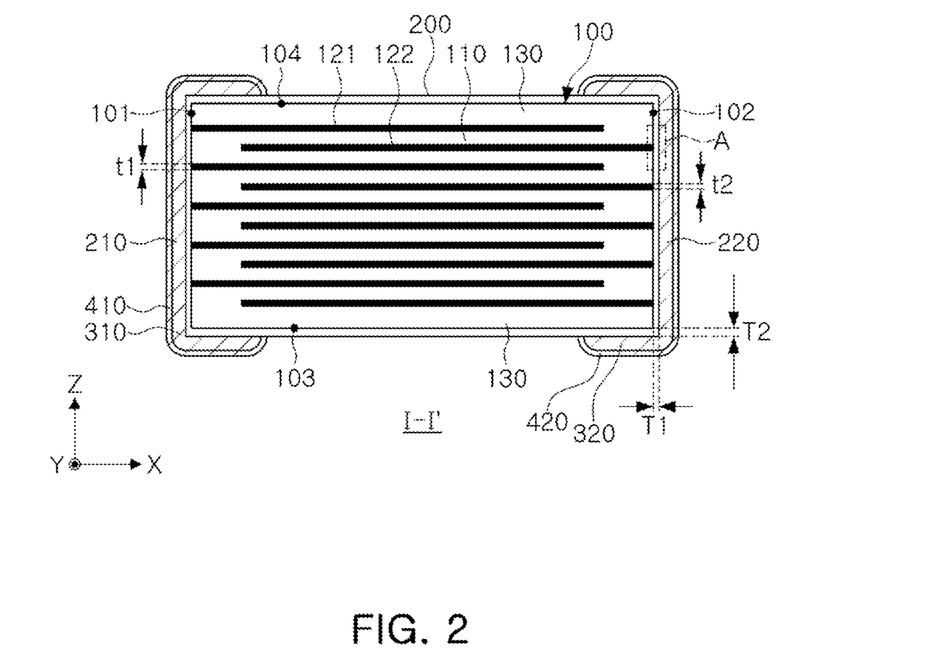
FIG. 2 is a schematic cross-sectional view taken along line I-I' of FIG. 1.
Figure 3:
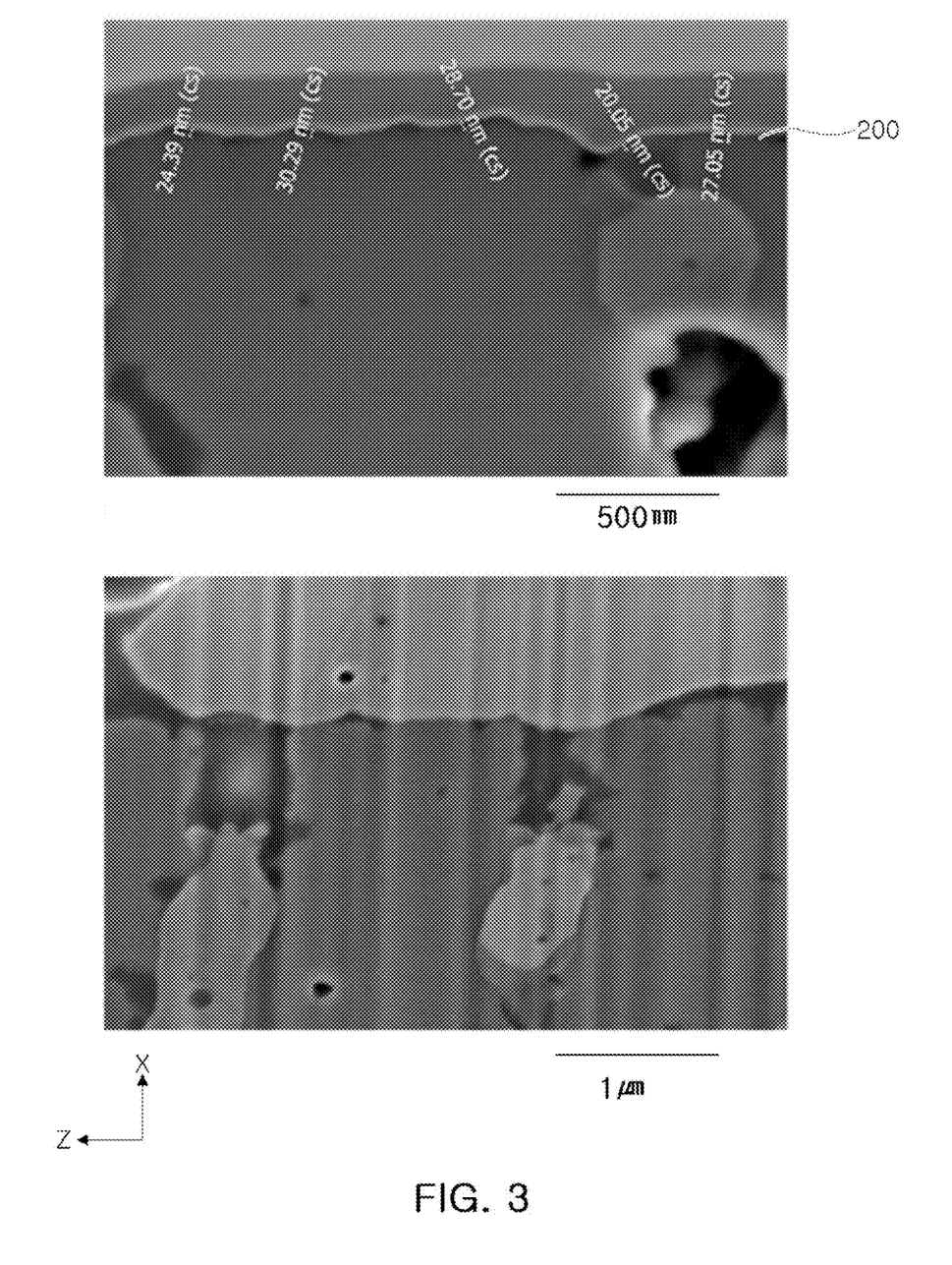
FIG. 3 is a scanning electron microscope (SEM) image of portion "A" of FIG. 2, in Experimental Example 4.
Figure 4:
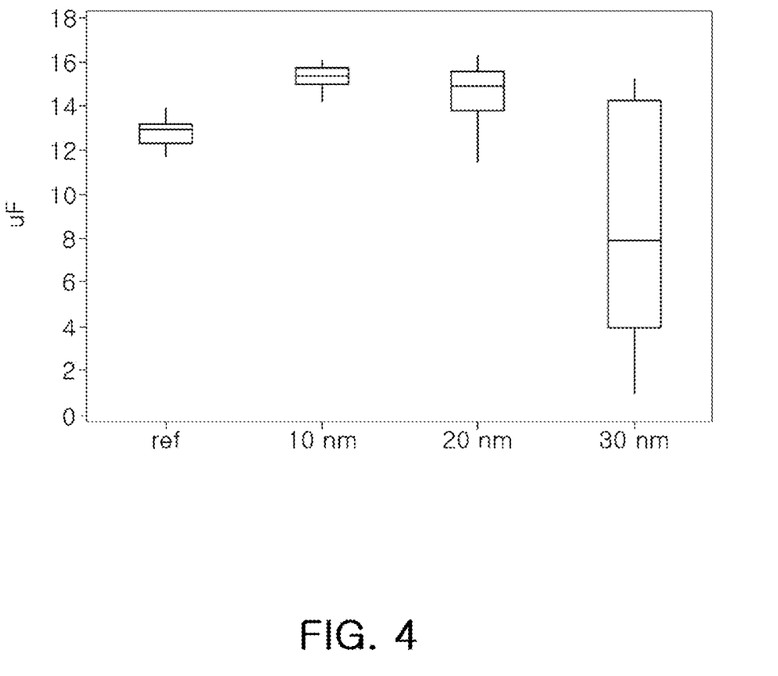
FIG. 4 is a diagram illustrating capacitances of Experimental Examples 1 to 4.
Figure 5A:
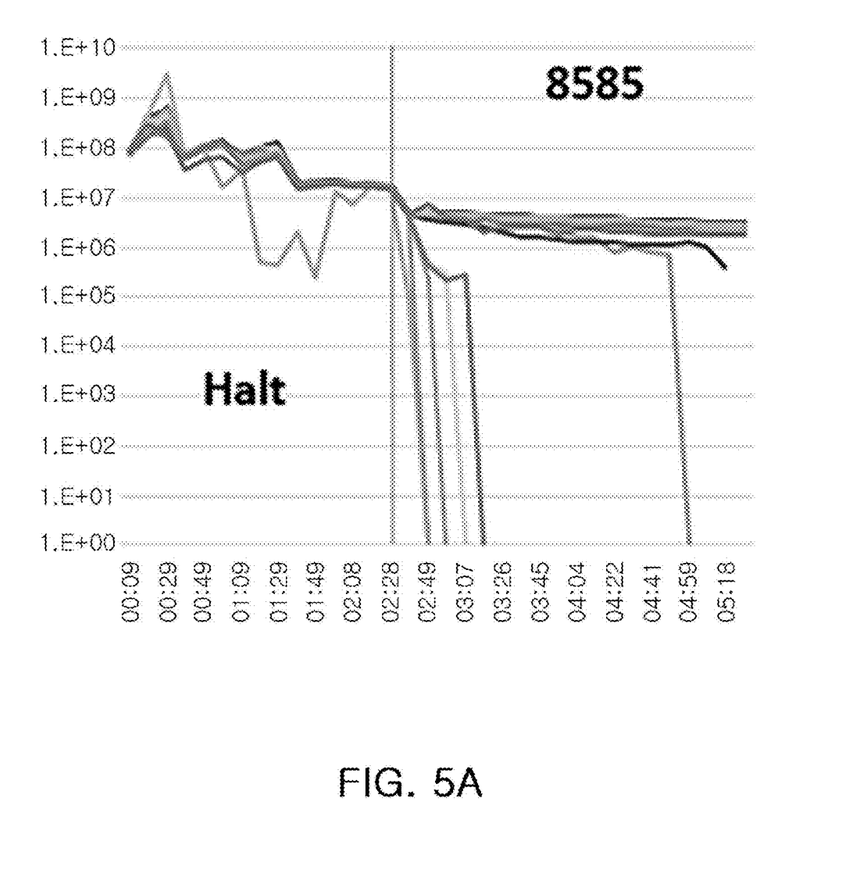
FIGS. 5A and 5B are diagrams illustrating results of accelerated lifespan evaluation and moisture resistance reliability evaluation of Experimental Example 1 and Experimental Example 2.
Figure 5B:
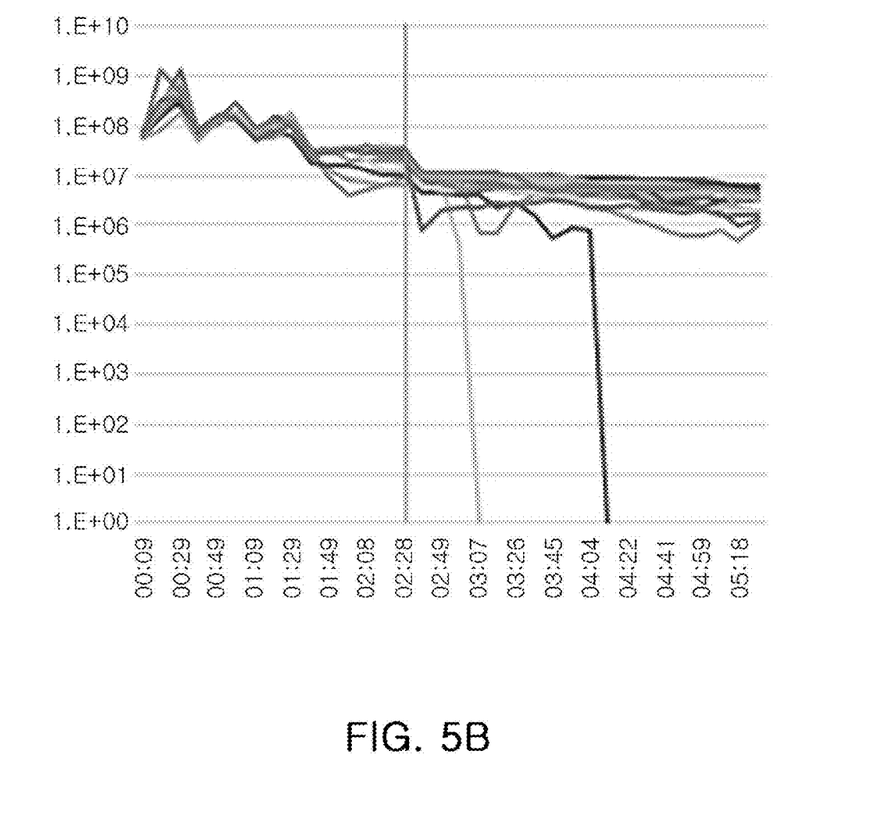

FIG. 1 is a schematic perspective view of a capacitor component according to an exemplary embodiment. FIG. 2 is a schematic cross-sectional view taken along line I-I' of FIG. 1. FIG. 3 is a scanning electron microscope (SEM) image of portion "A" of FIG. 2, in Experimental Example 4. FIG. 4 is a diagram illustrating capacitances of Experimental Examples 1 to 4. FIGS. 5A and 5B are diagrams illustrating results of accelerated lifespan evaluation and moisture resistance reliability evaluation of Experimental Example 1 and Experimental Example 2.

Referring to FIGS. 1 and 2, a capacitor component 1000 according to the present embodiment may include a body 100, a protective layer 200, and external electrodes 310 and 320, and may further include plating layers 410 and 420. The body 100 may include a dielectric layer 110 and internal electrode layers 121 and 122.

The body 100 may form an exterior of the capacitor component 1000 according to the present embodiment. A shape of the body 100 is not limited to any particular shape, but as illustrated in the drawings, the body 100 may have a hexahedral shape or a shape similar thereto. Due to shrinkage of ceramic powder particles contained in the body 100 during a sintering process, the body 100 may not have a hexahedral shape having completely straight lines but may have a substantially hexahedral shape.

The body 100 may have a third surface 103 and a fourth surface 104 opposing each other in a thickness direction Z, a first surface 101 and a second surface 102 opposing each other in a length direction X, and a fifth surface 105 and a sixth surface 106 opposing each other in a width direction Y, based on FIGS. 1 and 2. Each of the third to sixth surfaces 103, 104, 105, and 106 of the body 100 may correspond to a wall surface of the body 100 connecting the first surface 101 and the second surface 102 of the body 100 to each other. Hereinafter, both end surfaces (one end surface and the other end surface) of the body 100 may refer to the first surface 101 and the second surface 102 of the body 110, respectively, and both side surfaces (one side surface and the other side surface) of the body 100 may refer to the fifth surface 105 and the sixth surface 106 of the body 100, respectively. In addition, one surface and the other surface of the body 100 may refer to the third surface 103 and the fourth surface 104 of the body 100, respectively. One surface of the body 100 may be used as a mounting surface when the capacitor component 1000 according to the present embodiment is mounted on a mounting board such as a printed circuit board (PCB).

The body 100 may include a dielectric layer 110 and first and second internal electrode layers 121 and 122 alternately disposed with the dielectric layer 110 interposed therebetween. Each of the dielectric layer 110, the first internal electrode layer 121, and the second internal electrode layer 122 may be provided as a plurality of layers. Hereinafter, the first and second internal electrode layers 121 and 122 will be collectively referred to as internal electrode layers 121 and 122, except for the case in which they are required to be distinguished from each other. Accordingly, the description of portions collectively referred to as the internal electrode layers 121 and 122 may be commonly applied to the first and second internal electrode layers 121 and 122.

A plurality of dielectric layers 110 constituting the body 100 are in a sintered state and may be integrated, such that boundaries therebetween may not be readily apparent without using a scanning electron microscope (SEM).

A material forming the dielectric layers 110 is not limited as long as sufficient capacitance may be obtained therewith and may be, for example, barium titanate ($BaTiO_3$) powder. The material forming the dielectric layers 110 may include various additives, organic solvents, plasticizers, binders, dispersants, and the like, added to the $BaTiO_3$ powder, or the like, according to the purpose of the present disclosure.

A cover layer 130 may be disposed on upper and lower portions of the body 100, for example, both end portions of the body 100 in the thickness direction (the Z direction). The cover layer 130 may serve to maintain reliability of the capacitor component against external impacts. The cover layer 130 may be formed using a material for forming the dielectric layer 110, or a material different from the material for forming the dielectric layer 110. For example, in the latter case, the material for forming the dielectric layer 110 and the material for forming the cover layer 130 are different in terms of at least one of a composition, a size, a content, and dispersion degree of ceramic particles in the material, or at least one of a composition, a size, a content, and dispersion degree of sub-components in the material.

The internal electrode layers 121 and 122 may be disposed alternately with the dielectric layer 110, and may have a shape similar to an overall plate shape. The internal electrode layers 121 and 122 may include first and second internal electrode layers 121 and 122.

The internal electrode layers 121 and 122 may be alternately exposed to (or be alternately in contact with or alternately extend from) the first surface 101 and the second surface 102, respective opposite end surfaces of the body 100 in a length direction X, to be connected to the first and second external electrodes 310 and 320. For example, the first internal electrode layer 121 may be exposed to the first surface 101 of the body 100 so as to be connected to the first external electrode 310, and may not be exposed to the second surface 102 of the body 100 so as not to be connected to the second external electrode 320. The second internal electrode layer 122 may be exposed to the second surface 102 of the body 100 so as to be connected to the second external electrode 320, and may not be exposed to the first surface 101 of the body 100 so as not to be connected to the external electrode 310. Accordingly, the first internal electrode layer 121 may be spaced apart from the second surface 102 of the body 100 by a predetermined distance, and the second internal electrode layer 122 may be spaced apart from the first surface 101 of the body 100 by a predetermined distance. In this case, the internal electrode layers 121 and 122 may be electrically insulated from each other by the dielectric layer 110 disposed therebetween.

The internal electrode layers 121 and 122 may include, for example, one or more conductive materials, among palladium (Pd), silver (Ag), nickel (Ni), and copper (Cu). As an example, the internal electrode layers 121 and 122 may be formed by laminating a conductive paste, including first powder particles of nickel (Ni), second powder particles including nickel (Ni) and carbon (C), a binder, and a solvent, on a dielectric green sheet and sintering the laminated conductive paste. Accordingly, the internal electrode layers 121 and 122 may include nickel (Ni).

The internal electrode layers 121 and 122 may have thicknesses $t1$ and $t1$ of 10 nm or more to 500 nm or less, respectively. When each of the thicknesses $t1$ and $t2$ of the internal electrode layers 121 and 122 is less than 10 nm, connectivity of the internal electrode layers 121 and 122 may be deteriorated to decrease capacitance. When each of the thicknesses $t1$ and $t2$ of the internal electrode layers 121 and 122 is greater than 500 nm, the dielectric layer 110 may be formed to have a low thickness, based on a component having the same size, so that it may be difficult to electrically insulate the internal electrodes 121 and 122 from each other.

The thicknesses of the internal electrode layers 121 and 122 may be measured using an optical image or an SEM image obtained by scanning an X-Z cross-section in which the capacitor component is taken in a central portion in the width direction Y. As an example, the thickness of the internal electrode layers 121 and 122 may refer to a value obtained by selecting one of the internal electrode layers 121 and 122 illustrated in the image, measuring a dimension of the selected internal electrode in the Z direction twice or more, and arithmetically averaging the measured dimensions. The measuring of the dimension twice or more may be performed at regular intervals, but exemplary embodiments are not limited thereto. In addition, the thickness of the internal electrode layers 121 and 122 may refer to a value obtained by calculating a thickness of each of the internal electrode layers 121 and 122, illustrated in the image, in the above-described method, and dividing the calculated thickness by the total number of electrode layers 121 and 122.

Voids and ceramic particles may be disposed in the internal electrode layers 121 and 122. The ceramic particles may be formed by ceramic powder particles, such as barium titanate, additionally added to the conductive paste for forming an internal electrode layer. The ceramic particles may include a barium titanate-based material, similarly to the dielectric of the dielectric layer 110, but exemplary embodiments are not limited thereto. The voids may be formed due to diffusion and recrystallization during a sintering process of the conductive powder included in the conductive paste, or may be formed by removing an organic material such as a solvent included in the conductive paste during the sintering process, or may be formed by diffusing ceramic powder particles included in the conductive paste to the dielectric layer 110 during a sintering process.

The protective layer 200 may be disposed on the body 100. The protective layer 200 may be disposed on the first to sixth surfaces 101, 102, 103, 104, 105, 106 of the body 100 to cover the entire surface of the body 100, and may be disposed between the body 100 and external electrodes 310 and 320 to be described later.

The protective layer 200 may include oxide ceramic. The oxide ceramic of the protective layer 200 may have an average polarizability of oxide ions ($\alpha_{O2-}$) of 2 Å$^3$ or more and band gap energy of 3.0 eV or more and 4.0 eV or less. When the average polarizability of oxide ions ($\alpha_{O2-}$) of the oxide ceramic is 2 Å$^3$ or more, moisture permeation may be suppressed to improve moisture resistance reliability of the entire component. When the oxide ceramic has band gap energy of 3.0 eV or more and 4.0 eV or less, it may be transparent with respect to visible light, so that the exterior of the body can be checked with the naked eye.

The term "average polarizability of oxygen ions" refers to average polarizability of oxide ions in oxide ceramics. As disclosed in V. Dimitrov and T. Komatsu, "Classification of Simple Oxides: A Polarizability Approach," Journal of Solid State Chemistry 163, 100-112 (2002), the average polarizability of oxygen ions may refer to an arithmetic average of polarizability of oxide ions calculated from a refractive index ($\alpha_{O2-}$ ($n_0$)) and polarizability of oxide ions calculated from an energy gap ($\alpha_{O2-}$ ($E_g$)). The polarizability of oxide ions calculated from a refractive index ($\alpha_{O2-}$ ($n_0$)) may be calculated by Equation 1 below, and the polarizability of oxide ions calculated from an energy gap ($\alpha_{O2-}$ ($E_g$)) may be calculated by Equation 2 below.

$$\alpha_{O2-}(n_0)=[(V_m/2.52)(n_0^2-1)/(n_0^2+2)-p\alpha_i]q^{-1} \quad \text{[Equation 1]}$$

$$\alpha_{O2-}(E_g)=[(V_m/2.52)(1-\sqrt{E_g/20})-p\alpha_i]q^{-1} \quad \text{[Equation 2]}$$

(In each of Equations 1 and 2, Vm: molar volume, $n_0$: refractive index, $\alpha_i$: cation polarizability, Eg: energy gap, P: mole number of cations in the oxide ceramic (referring to a case in which the oxide ceramic is represented in a simplest integer ratio), and q: mole number of oxygen in the oxide ceramic (referring to a case in which the oxide ceramic is represented in a simplest integer ratio)).

Titanium oxide ($TiO_2$), tin dioxide ($SnO_2$), and zinc oxide (ZnO) satisfy both conditions of the above-described average polarizability of oxide ions and conditions of the above-described band gap energy. Accordingly, the oxide ceramic of the protective layer 200 in the present embodiment may include at least one of titanium oxide ($TiO_2$), tin dioxide ($SnO_2$), and zinc oxide (ZnO).

The oxide ceramic of the protective layer 200 may be formed by applying a conductive paste for forming an internal electrode layer to a dielectric green sheet, laminating a plurality of dielectric green sheets, applied with the conductive paste, to forma green chip, sintering the green chip to form the body 100, and performing a vapor deposition process on the first to sixth surfaces 101, 102, 103, 104, 105, 106 of the body 100. In the present embodiment, the oxide ceramic may be formed on the surface of the body 100 using an oxide ceramic sputtering target and RF-sputtering apparatus, but the scope of the present disclosure is not limited thereto.

The protective layer 200 may include the same metal as the metal of the internal electrode layers 121 and 122. As an example, when the internal electrode layers 121 and 122 are formed by sintering a conductive paste containing nickel (Ni) powder particles, the protective layer 200 may include nickel (Ni), a metal element of the internal electrode layers 121 and 122.

A metal element of the internal electrode layers 121 and 122 may be diffused to the protective layer 200 due to a heat treatment in the sintering process when the external electrodes 310 and 320 are sintered to be formed after the protective layer 200 is formed. As a result, the metal element of the internal electrode layers 121 and 122 contained in the protective layer 200 may be substitutional or interstitial in a lattice of the oxide ceramic of the protective layer 200. In addition, a content of the metal element in the internal electrode layers 121 and 122 contained in the protective layer 200 is higher in a region, close to the body 100, of the protective layer 200 than in a region, close to the external electrodes 310 and 410, of the protective layer 200. Scanning electron microscopy-energy dispersive spectroscopy (SEM-EDS) measurement may be performed to observe whether the protective layer 200 contains the metal element of the internal electrode layers 121 and 122 and the content of the metal element of the internal electrode layer contained in the protective layer 200. In addition, the above SEM-EDS measurement may be performed twice or more for each region to obtain an arithmetic average of the measured values.

The protective layer 200 may cover the entire surface of the body 100. For example, the protective layer 200 may cover all of the first to sixth surfaces 101, 102, 103, 104, 105, and 106 of the body 100.

A thickness T1 of the protective layer 200, disposed on each of the first and second surfaces 101 and 102 of the body 100, may be lower than a thickness T2 of the protective layer 200 disposed on the third surface 103 of the body 100. Since the first and second surfaces 101 and 102 of the body 100 require an electrical connection between the internal electrode layers 121 and 122 and the external electrodes 310 and 320, the thickness T1 of the protective layer 200 disposed on the first and second surfaces 101 and 102 of the body 100 may be less than 30 nm. When the thickness T1 of the protective layer 200 disposed on the first and second surfaces 101 and 102 of the body 100 is 30 nm or more, connectivity between an internal electrode layer and an external electrode may be deteriorated to make it difficult to implement capacitance, as illustrated in FIG. 4. The thickness T2 of the protective layer 200 disposed on the third surface 103 of the body 100 may be, as a non-limiting example, 30 nm or more. Since the third surface 103 of the body 100 does not need to provide an electrical connection between the internal electrode layers 121 and 122 and the external electrodes 310 and 320, sufficient thickness may be secured to improve moisture resistance reliability.

The thicknesses T1 and T2 of the protective layer 200 may refer to an average thickness. In addition, the thicknesses T1 and T2 of the protective layer 200 may be measured using an optical image or an SEM image obtained by scanning an X-Z cross-section in which the capacitor component is taken in a central portion in the width direction Y. As an example, the thickness T1 of the protective layer 200 may refer to a value obtained by selecting a region disposed in the center of the protective layer 200 illustrated in the image when the protective layer 200 is equally divided into three portions, measuring a dimension of the protective layer 200 in the X direction in a corresponding central portion twice or more, and calculating an arithmetic average of the measured values. The measuring of the dimension twice or more may be performed at regular intervals, but exemplary embodiments are not limited thereto. The thickness T2 of the protective layer 200 may be measured in a similar manner.

The protective layer 200 may further include an oxide of at least one of silicon (Si), manganese (Mn), and aluminum (Al). For example, the protective layer 200 may include at least one of silicon dioxide ($SiO_2$), manganese oxide (MgO), and aluminum oxide ($Al_2O_3$). Silicon dioxide ($SiO_2$), manganese oxide (MnO), and aluminum oxide ($Al_2O_3$) may function as a glass former, and may further improve the moisture resistance reliability of the protective layer 200. For example, the above-mentioned materials may fill defects such as voids, pin holes, and cracking in the protective layer 200 to improve the moisture resistance reliability.

The external electrodes 310 and 320 may be disposed on at least a portion of the protective layer 200, and may be connected to the internal electrode layers 121 and 122. For example, the external electrodes 310 and 320 may not be in physical contact with the internal electrode layers 121 and 122 by the protective layer 200, but may be electrically connected to the internal electrode layers 121 and 122 by the protective layer 200. As illustrated in FIGS. 1 and 2, the external electrodes 310 and 320 may include first and second external electrodes 310 and 320, respectively disposed on the first and second surfaces 101 and 102 of the body 100 to be connected to the first and second internal electrode layers 121 and 122.

The first and second external electrodes 310 and 320 may include first and second connection portions and first and second extension portions, respectively. The first and second connection portions may be disposed on the first and second surfaces 101 and 102 of the body 100 to be connected to the first and second internal electrode layers 121 and 122, respectively. The first and second extension portions may extend upwardly of the third surface 103 of the body 100 from the first and second connection portions, respectively. The first and second extension portions may be disposed to be spaced apart from each other on the third surface 103 of the body 100. The first and second extension portions may extend upwardly of not only the third surface 103 of the body 100, but also each of the fourth to sixth surfaces 104, 105, and 106 of the body 100, but the scope of the present disclosure is not limited thereto. For example, as illustrated in FIG. 1, each of the external electrodes 310 and 320 of the present disclosure may be of a normal-type electrode formed on five surfaces of the body 100, but exemplary embodiments are not limited thereto. Each of the external electrodes 310 and 320 may be an L-type electrode formed on two surfaces of the body 100, a C-type electrode formed on three surfaces of the body 100, or the like.

The external electrodes 310 and 320 may be formed by applying a sintering-type conductive paste, including a conductive metal and glass, to the body 100 on which the protective layer 200 is formed, and sintering the applied paste. The conductive metal may include at least one of nickel (Ni), copper (Cu), silver (Ag), and palladium (Pd). A metal element of the external electrodes 310 and 320 may be diffused to the protective layer 200 by the above-described sintering process. Due to such a mechanism, the content of the metal element of the external electrodes 310 and 320 contained in the protective layer 200 may be higher in a region, close to the external electrodes 310 and 320, of the protective layer 200 than in a region, close to the body 100, of the protective layer 200. Scanning electron microscopy-energy dispersive spectroscopy (SEM-EDS) measurement may be performed to observe whether the protective layer 200 contains the metal element of the internal electrode layers 121 and 122 and the content of the metal element of the internal electrode layer contained in the protective layer 200. In addition, the above SEM-EDS measurement may be performed twice or more for each region to obtain an arithmetic average of the measured values.

The plating layers 410 and 420 may be formed on the external electrodes 310 and 320 by a plating method, respectively. For example, each of the plating layers 410 and 420 may include at least one of a nickel (Ni) plating layer and a tin (Sn) plating layer formed on the external electrodes 310 and 320 by a plating process. Although not illustrated in the drawings, a conductive resin layer may be disposed between the external electrodes 310 and 320 and the plating layers 410 and 420. The conductive resin layer may be formed by applying a curing-type conductive paste, containing a conductive metal and a curing-type resin, and curing the applied conductive paste. The conductive metal of the conductive resin layer may include at least one of copper (Cu) and silver (Ag).

Experimental Example

A green body was manufactured using a dielectric green sheet and a conductive paste for forming an internal electrode layer, and was then sintered to manufacture a body. In Experimental Example 1, while using a body manufactured in the same lot, a sintering-type conductive paste was directly applied to a body surface and was then sintered to form an external electrode. In Experimental Examples 2 to 4, a protective layer including $TiO_2$ was formed on a surface of a body using a $TiO_2$ target and a room-temperature RF sputtering method, and a sintering-type conductive paste was then applied to the protective layer and sintered to form an external electrode. In Experimental Example 2, a sputtering process was performed for 10 minutes, so that an average thickness of a protective layer was 10 nm. In Experimental Example 3, a sputtering process was performed for 20 minutes, so that an average thickness of a protective layer was 20 nm. In Experimental Example 4, a sputtering process was performed for 30 minutes, so that an average thickness of a protective layer was 30 nm.

In Experimental Examples 1 to 4, an external electrode was formed by applying a paste to a thickness of 40 μm and then sintering the applied paste at a sintering temperature of 735° C. fora sintering time of 120 minutes. In the case of Experimental Example 1, a resin electrode layer was additionally formed by applying and curing a curing-type conductive paste after formation of the external electrode.

In Experimental Examples 1 to 4, the other conditions were the same, except for only the above-described sputtering condition for forming a protective layer. As an example, the other conditions included i) a composition of a dielectric green sheet, ii) a composition and a content of ceramic powder particles included in the conductive paste for forming an internal electrode layer, iii) a size of a green body (L*W*T), iv) temperature-rising condition and sintering conditions such as a sintering atmosphere, and the like, v) the total number of dielectric layers, vi) the total number of internal electrode layers, vii) an average thickness of the internal electrode layer, viii) an average thickness of the dielectric layer, and ix) a composition and formation conditions of the external electrode. As an example, in all of Experimental Examples 1 to 4, an average thickness of each internal electrode layer was 200 nm, an average thickness of each dielectric layer was 800 nm, the total number of internal electrode layers was 460, and the size of the green body was L=1200 μm, W=700 μm, T=600 μm, which were the same.

Reliability evaluation employed a composite reliability evaluation method. The reliability evaluation was performed on 40 specimens for each experimental example, as illustrated as each step of Table 1.

TABLE 1

| | Temperature (° C.) | Humidity (%) | Voltage (V) | Time (hr) |
|---|---|---|---|---|
| Step 1 | 40 | 0 | 12 | 0.5 |
| Step 2 | 40 | 0 | 20 | 0.5 |
| Step 3 | 85 | 0 | 12 | 0.5 |
| Step 4 | 105 | 0 | 12 | 1 |
| Step 5 | 85 | 85 | 20 | 3 |

Referring to FIG. 3, it was confirmed that an average thickness of a protective layer formed on a body during a sputtering process performed for 30 minutes was 30 nm (top in FIG. 3), and it can be seen that after formation of an external electrode, an existing state in which an internal electrode layer was depressed is maintained (bottom in FIG. 3). It can be seen that in the case of Experimental Example 4 in which $TiO_2$ having an average thickness of 30 nm was formed, diffusion of nickel (Ni) in an internal electrode layer was suppressed to result in poor connectivity between nickel (Ni) and a copper (Cu) external electrodes.

FIG. 4 illustrates the dose results of each of Experimental Examples 1 to 4. On an X-axis of FIG. 4, Experimental Example 1 is represented by Ref, and Experimental Examples 2 to 4 are represented by a thickness of $TiO_2$. As confirmed in FIG. 3, in the case of Experimental Example 4 in which $TiO_2$ having an average thickness of 30 nm was formed, electrical connectivity between an internal electrode layer and an external electrode was deteriorated, resulting in a severe contact issue. However, in Experimental Examples 2 and 3 in which $TiO_2$ having an average thickness of less than 30 nm was formed, implementation of capacitance was confirmed. This is considered to be because, in Experimental Examples 2 and 3 in which $TiO_2$ having an average thickness of less than 30 nm was formed, nickel (Ni) in an internal electrode layer may be diffused through $TiO_2$ to be connected to Cu, and current may flow due to tunneling of a $TiO_2$ layer having a relatively low thickness.

FIGS. 5A and 5B illustrate results of a composite reliability evaluation of each of Experimental Examples 1 and 2. In a Halt region, failure did not occur in both of Experimental Examples 1 and 2. However, in the case of Experimental Example 1, initial five lines failed as they entered a moisture resistant atmosphere (region 8585 in the drawings), and one line additionally failed after two hours passed (see FIG. 5A). Meanwhile, in the case of Experimental Example 2 in which $TiO_2$ having an average thickness of 10 nm was formed, initial failure did not occur as it entered a moisture resistant atmosphere, and one line additionally failed after 30 minutes passed and another line additionally failed after an hour passed (see FIG. 5B). This is considered to be because, unlike Experimental Example 1, in the case of Experimental Example 2, a protective layer suppresses humidity permeation to cause a difference in initial failures.

As described above, a capacitor component according to an aspect of the present disclosure may improve moisture resistance reliability.

A capacitor component according to another aspect of the present disclosure may allow current to flow between an internal electrode layer and an external electrode while improving moisture resistance reliability.

While exemplary embodiments have been shown and described above, it will be apparent to those skilled in the art that modifications and variations could be made without departing from the scope of the present disclosure as defined by the appended claims.

What is claimed is:

1. A capacitor component comprising:
a body including a dielectric layer and an internal electrode layer;
a protective layer disposed on the body; and
an external electrode disposed on at least a portion of the protective layer,
wherein the protective layer includes oxide ceramic and a metal the same as a metal of the internal electrode layer,
the body has a first surface, which the internal electrode layer is in contact with, a second surface opposing the first surface, and a third surface connecting the first and second surfaces to each other, and
an average thickness of the protective layer, disposed on the first surface of the body, is less than 30 nm.

2. The capacitor component of claim 1, wherein:
the oxide ceramic has an average polarizability of oxide ion ($\alpha_{O2-}$) of 2 Å$^3$ or more.

3. The capacitor component of claim 1, wherein:
the oxide ceramic has band gap energy of 3.0 eV or more to 4.0 eV or less.

4. The capacitor component of claim 1, wherein:
the oxide ceramic includes at least one of titanium oxide ($TiO_2$), tin dioxide ($SnO_2$), or zinc oxide (ZnO).

5. The capacitor component of claim 4, wherein:
the internal electrode layer includes nickel (Ni).

6. The capacitor component of claim 1, wherein:
a content of the metal the same as the metal of the internal electrode layer, contained in the protective layer, is higher in a region, close to the body, of the protective layer than in a region, close to the external electrode, of the protective layer.

7. The capacitor component of claim 1, wherein:
the protective layer covers an entire surface of the body.

8. The capacitor component of claim 7, wherein:
the external electrode and the internal electrode layer are physically spaced apart from each other and connected to each other by the protective layer.

9. The capacitor component of claim 1, wherein:
an average thickness of the protective layer, disposed on the third surface of the body, is higher than an average thickness of the protective layer disposed on the first surface of the body.

10. The capacitor component of claim 1, wherein:
the protective layer further includes an oxide of at least one of silicon (Si), manganese (Mn), or aluminum (Al).

11. The capacitor component of claim 1, wherein:
the protective layer further includes a metal the same as a metal of the external electrode.

12. The capacitor component of claim 11, wherein:
the external electrode includes copper (Cu).

13. The capacitor component of claim 11, wherein:
a content of the metal the same as the metal of the external electrode, contained in the protective layer, is higher in a region, close to the external electrode, of the protective layer than in a region, close to the body, of the protective layer.

14. A method of manufacturing a capacitor component, the method comprising:
forming a dielectric green sheet;
applying a first conductive paste to the dielectric green sheet;
laminating the dielectric green sheets, applied with the first conductive paste, in plural to form a green chip;
sintering the green chip to form a body including a dielectric layer and an internal electrode layer;
forming a protective layer to cover the body using a vapor deposition process; and
forming an external electrode on at least a portion of the protective layer,
wherein after the forming the external electrode, the protective layer includes oxide ceramic, having an average polarizability of oxide ions ($\alpha_{O2-}$) of 2 Å$^3$ or more, and a metal the same as a metal of the internal electrode layer,
the body has a first surface, which the internal electrode layer is in contact with, a second surface opposing the first surface, and a third surface connecting the first and second surfaces to each other, and
an average thickness of the protective layer, disposed on the first surface of the body, is less than 30 nm.

15. The method of claim 14, wherein:
in the forming the external electrode, the external electrode is formed by applying a second conductive paste to the protective layer and then sintering the applied second conductive paste.

16. The method of claim 15, wherein:
in the forming the external electrode, the metal of the internal electrode layer is diffused to the protective layer.

17. The method of claim 14, wherein:
after the forming the external electrode, the oxide ceramic has band gap energy of 3.0 eV or more and 4.0 eV or less.

18. A capacitor component comprising:
a body including a dielectric layer and an internal electrode layer;
an external electrode disposed the body; and
a protective layer disposed between the internal electrode layer and the external electrode, and including a metal and oxide ceramic having an average polarizability of oxide ion ($\alpha_{O2-}$) of 2 Å$^3$ or more,
wherein the body has a first surface, which the internal electrode layer is in contact with, a second surface opposing the first surface, and a third surface connecting the first and second surfaces to each other, and
an average thickness of the protective layer, disposed on the first surface of the body, is less than 30 nm.

19. The capacitor component of claim 18, wherein:
the oxide ceramic has band gap energy of 3.0 eV or more to 4.0 eV or less.

20. The capacitor component of claim 18, wherein:
the oxide ceramic includes at least one of titanium oxide (TiO$_2$), tin dioxide (SnO$_2$), or zinc oxide (ZnO).

21. The capacitor component of claim 18, wherein:
the protective layer extends between the external electrode and the dielectric layer.

22. The capacitor component of claim 18, wherein:
an average thickness of the protective layer, disposed on the third surface of the body, is higher than an average thickness of the protective layer disposed on the first surface of the body.

* * * * *